3,162,692
**PROCESS FOR PREPARING TRIFLUORO-
NITROSOALKANE**
George H. Crawford, Jr., White Bear Lake, and David E.
Rice, Minneapolis, Minn., assignors to Minnesota Mining and Manufacturing Company, St. Paul, Minn., a
corporation of Delaware
Filed Apr. 23, 1963, Ser. No. 275,060
3 Claims. (Cl. 260—647)

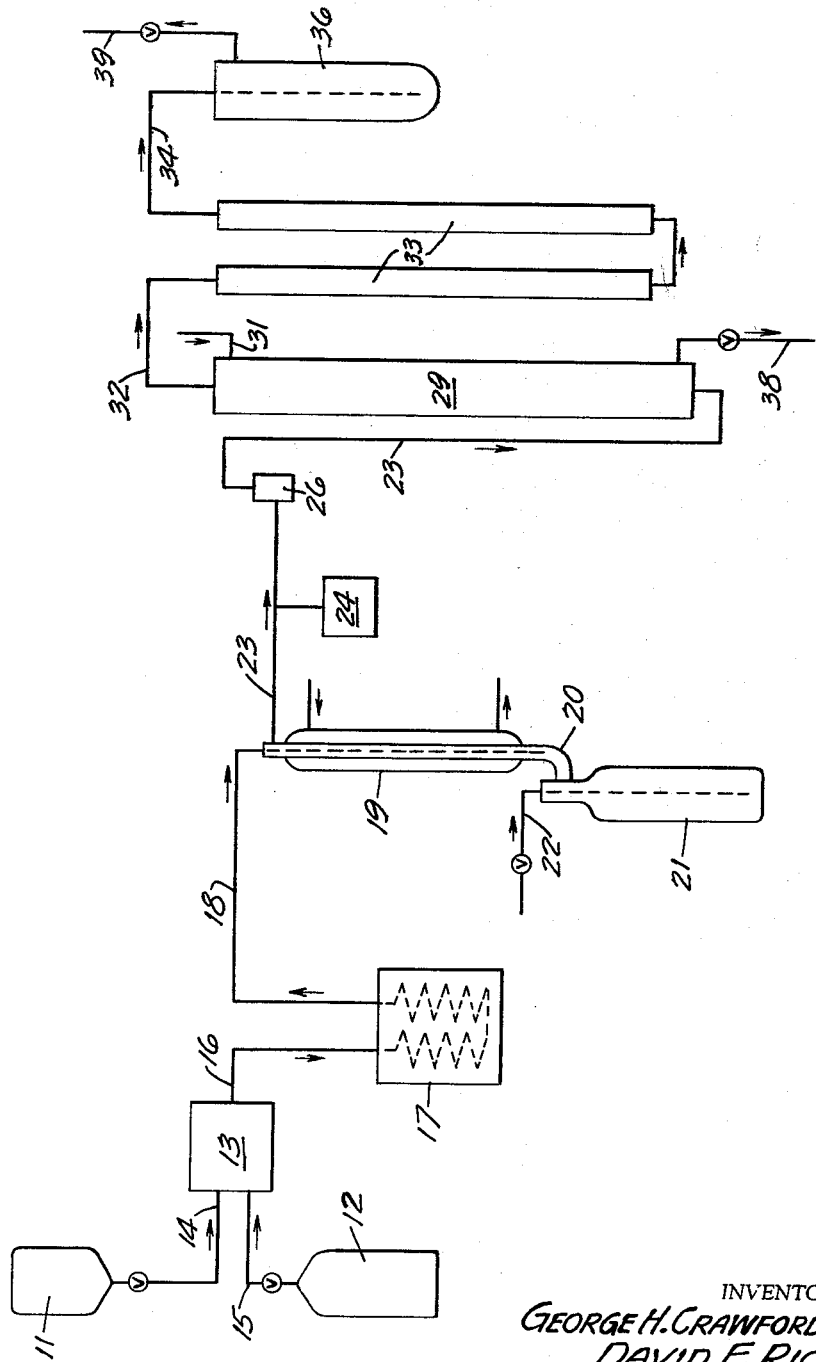

This invention relates to a method for the preparation of perfluoronitrosoalkanes. In one aspect this invention relates to the process technique for the pyrolytic conversion of trifluoroacetyl nitrite to trifluoronitrosomethane.

In application Ser. No. 227,839, filed October 2, 1962, there is disclosed a method for the preparation of fluorine-containing acyl nitrites, and the decarboxylation of these nitrites to produce nitroso alkanes. The decarboxylation to the nitrosoalkane may be accomplished by pyrolysis. The pyrolysis of trifluoroacetyl nitrite is carried out in the vapor phase in view of the fact that the boiling point of the trifluoroacetyl nitrite is below the pyrolysis temperature. This fact raises several difficulties in the production of nitrosoalkane. The gas phase pyrolysis of trifluoroacetylnitrite is uneconomical because the ratio of reactor volume to reactor output is very high. In addition, extreme care must be utilized in preventing the accumulation of nitrite vapor, which may cause detonation. This difficulty is not as pronounced with the higher homologs of the nitrite series since such homologs have boiling points above the pyrolysis temperature. Another method for the conversion of the nitrite to the nitrosoalkane is the photolytic decarboxylation of the nitrite with ultraviolet irradiation. Although this eliminates some of the difficulties above referred to, the yield is low and the reactor volume to output ratio is very high; and as a result, this technique is uneconomical. It is therefore much to be desired to provide a process technique for continuously decarboxylating the nitrite to the nitrosoalkane and which technique would eliminate the above difficulties encountered with prior suggestions.

It is an object of this invention to provide a new process for the preparation of nitrosoalkanes.

It is another object of this invention to provide a safe and economical method for the production of perfluoronitrosomethane.

Still another object of this invention is to provide a method for the production of perfluoronitrosomethane from trifluoroacetyl nitrite characterized by high yield and relatively low reactor volume to output ratio.

Various other objects and advantages of the present invention will become apparent to those skilled in the art from the accompanying description and disclosure.

In accordance with this invention, trifluoroacetyl nitrite is decarboxylated in the presence of a refluxing inert solvent at a pressure sufficient to maintain the trifluoroacetyl nitrite in the liquid phase at the decarboxylation temperature. The inert solvent utilized is a fluorocarbon solvent, preferably a perhalofluorocarbon solvent such as perfluorocyclohexane (B.P. 52° C.), perfluoromethyl-cyclopentane (B.P. 76° C.), 1,3-dichlorohexafluoro-cyclobutane (B.P. 59° C.), perfluoromethyl-cyclohexane (B.P. 76° C.), perfluoroethyl-cyclopentane (B.P. 75° C.), perfluorodimethyl-cyclopentane (B.P. 72° C.), or mixtures of perhalofluorocarbons such as mixtures of perfluoro-cyclo-ethers boiling at 97 to 98° C., which solvents or mixtures thereof boil at a temperature below that of the trifluoroacetyl nitrite. The trifluoroacetyl nitrite boils at a temperature of about 99° C. at atmospheric pressure. The solvent or mixture of solvents utilized should therefore preferably boil at about 98° C. or lower, usually above 70° C., at atmospheric pressure. The solvent is also preferably miscible with the trifluoroacetyl nitrite. The temperature of pyrolysis or decarboxylation of the nitrite is approximately 150 to 170° C. Therefore the pressure utilized in the system will be sufficient to maintain the nitrite in liquid state at the decarboxylation temperature but permit refluxing or boiling of the solvent. Usually a pressure between about 50 and about 100 pounds gauge is used which pressure may conveniently be obtained by pressuring the system with nitrogen. The nitroso alkane product boils at a temperature below the decarboxylation temperature at the pressure utilized in the system and therefore is removed as a vapor continuously from the reaction zone. The nitrite feed may be continuously introduced into the reaction zone in order to make the process continuous. The volume ratio of solvent to nitrite in the reaction zone is at least 2:1.

It is one of the important features of the present invention to remove continuously the trifluoronitrosomethane from the reaction zone as it is formed and this is accomplished by continuously removing the product through a reflux condensor in which the solvent is condensed. The system lends itself readily and conveniently to the continuous removal of trifluoronitrosomethane since it is volatile at the conditions of reaction. This continuous removal of the trifluoronitrosomethane from the system accounts to a large degree for the success of the process.

In the prior suggested processes as described above for gas phase pyrolytic reaction and photolysis, the concentration of trifluoronitrosomethane is intentionally maintained very low in order to prevent detonation. As a result conversions are very low and the process inefficient. By refluxing the solvent and maintaining the nitrite in the liquid phase and removing the nitroso alkane as it is formed, the process is highly efficient and the yield is high. The nitroso alkane product from the reaction zone is passed through conventional separating and processing equipment to remove by-products and solvent and to purify the nitrosoalkane. The nitrosoalkane product is liquified for storage.

The drawing of the present application is a diagrammatic illustration, in elevation, showing a typical arrangement of apparatus in accordance with the present invention for the conversion of the nitrite to the nitrosoalkane starting with the production of the nitrite from the anhydride. In accordance with the drawing, trifluoroacetic anhydride is stored in storage vessel 11 under nitrogen pressure. Nitrogen sesquioxide is stored in storage vessel 12. These two reactants are passed to a metering and mixing pump 13 by means of conduits 14 and 15 and thence to a coil reactor 17 by conduit 16. The reaction is effected in reactor 17 between the trifluoroacetic anhydride and the nitrogen sesquioxide at a temperature of about 25° C., under sufficient pressure to maintain the reactants in liquid phase. The proportions of reactants at this point in the process are in a mol ratio of approximately 1:1. The process is continuous and trifluoroacetyl nitrite is continuously formed in reactor 17 and continuously passed by means of conduit 18 in heat exchange with reflux condensor 19 as shown to pyrolysis reactor 21. The pressure in reactor 21 is approximately 50 to 100 lbs. per square inch gauge and the temperature is approximately 150 to 160° C. Reflux condensor 19 is maintained at about 135 to 145° C. Inert fluorocarbon solvent, a mixture of perfluorocyclic ethers having a boiling point (97 to 98° C.) slightly below the boiling point of trifluoroalkane nitrite, is introduced into reactor 21 through conduit 22 when starting the reaction and as make up for loss of solvent passing overhead through conduit 20 with the product from reactor 21. The flow rates of trifluoroacetyl nitrite into reactor 21 usually ranges between about 0.5 cc. per minute to about 2.5 cc. per minute.

The pyrolysis product trifluoronitrosomethane is vaporzed in reactor 21 and is passed as a vapor from reactor 21 through conduit 20, reflux condensor 19 and thence through conduit 23 to counter-current scrubber 29. Surge tank 24 and back pressure regulator 26 are provided on conduit 23 to maintain the pressure in the system substantially constant. The back pressure regulator 26 is set so that gas generated by the reactor will be bled off as the pressure builds up in excess of the pre-set value. The back pressure regulator 26 must be accurate and maintain the pressure at a constant level of about ±2 lbs. per square inch gauge. Otherwise pressure surges and drops will cause periodic flooding of reflux condensor 19 and excess entrainment of solvent and nitrite into the surge tank 24. The gas bled from the back pressure regulator 26 has passed through a series of traps (not shown) comprising a first Dry Ice trap followed by a liquid nitrogen trap to recover reactants and product.

In counter-current scrubber 29, trifluoronitrosomethane is scrubbed with water introduced into the top of scrubber 29 through conduit 31 and removed at the bottom through conduit 38. Scrubber 29 removed carbon dioxide and any entrained nitrite. From scrubber 29 the scrubbed trifluoronitrosomethane is passed through a molecular sieve 33 by means of conduit 32. The molecular sieve removes the last trace of impurities in the trifluoronitrosomethane product. From molecular sieve 33 the purified trifluoronitrosomethane passes through conduit 34 to accumulator or storage unit 36 which is maintained slightly above liquid nitrogen temperature. The trifluoronitrosomethane is condensed in cooler-storage vessel 36 and maintained therein as a liquid. Nitrogen is removed by means of conduit 39. In addition to or in place of the molecular sieve 33 a fractional distillation unit may be employed to further purify the trifluoronitrosomethane.

The relative boiling points of solvent or diluent and nitrite are preferably selected such that under the condition of pyrolysis the distribution of nitrite between the vapor phase and liquid phase favors a higher concentration of nitrile in liquid phase. Various processes and conditions and alterations and modifications of the process may be practiced and become obvious to those skilled in the art without departing from the invention.

Having described our invention, we claim:

1. A process for decarboxylating a fluorinated acyl nitrite which comprises introducing fluorinated acyl nitrite into a reaction zone which is at the pyrolysis temperature of the nitrite containing a fluorocarbon solvent having a boiling point below the boiling point of the fluorinated acyl nitrite, maintaining a pressure in the reaction zone sufficient to maintain the fluorinated acyl nitrite in the liquid phase but such as to permit refluxing or boiling of the fluorocarbon solvent and continuously removing vaporous fluorinated nitrosoalkane as a product of the process from the reaction zone.

2. A process for decarboxylating trifluoroacetyl nitrite which comprises introducing trifluoroacetyl nitrite into a reaction zone which is at the pyrolysis temperature of the nitrite containing a perhalofluorocarbon solvent having a boiling point below the boiling point of the trifluoroacetyl nitrite, maintaining a pressure in the reaction zone sufficient to maintain the trifluoroacetyl nitrite in the liquid phase but such as to permit refluxing or boiling of the fluorocarbon solvent and continuously removing vaporous trifluoronitrosomethane as a product of the process from the reaction zone.

3. A process for decarboxylating trifluoroacetyl nitrite which comprises introducing trifluoroacetyl nitrite into a reaction zone which is at a temperature of about 150 to 170° C. containing a perhalofluorocarbon solvent comprising a mixture of perfluorocyclic ethers boiling at about 97 to 98° C. at atmospheric pressure in an amount by volume of at least twice the nitrite in the reaction zone, maintaining a pressure in the reaction zone sufficient to maintain the trifluoroacetyl nitrite in the liquid phase but such as to permit refluxing or boiling of the fluorocarbon solvent and continuously removing vaporous trifluoronitrosomethane as a product of the process from the reaction zone.

No references cited.